United States Patent
Shatdarshanam Venkata et al.

(10) Patent No.: US 12,106,352 B2
(45) Date of Patent: Oct. 1, 2024

(54) SYSTEMS AND METHODS FOR BI-LEVEL OPTIMIZATION OF STOCHASTIC RECOMMENDATIONS

(71) Applicant: Walmart Apollo, LLC, Bentonville, AR (US)

(72) Inventors: Sree Vasthav Shatdarshanam Venkata, Bangalore (IN); Kamiya Motwani, Madhya Pradesh (IN); Kannan Achan, Saratoga, CA (US); Basant Choudhary, Kolkata (IN); Rahul Ramkumar, Santa Clara, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 376 days.

(21) Appl. No.: 17/644,927

(22) Filed: Dec. 17, 2021

(65) Prior Publication Data
US 2023/0196436 A1    Jun. 22, 2023

(51) Int. Cl.
*G06Q 30/00*     (2023.01)
*G06N 7/01*      (2023.01)
*G06Q 10/0875*   (2023.01)
*G06Q 30/0601*   (2023.01)

(52) U.S. Cl.
CPC ........... *G06Q 30/0631* (2013.01); *G06N 7/01* (2023.01); *G06Q 10/0875* (2013.01)

(58) Field of Classification Search
CPC ............................................... G06Q 30/06–08
See application file for complete search history.

(56) References Cited

U.S. PATENT DOCUMENTS

| | | | |
|---|---|---|---|
| 10,244,286 B1 * | 3/2019 | Jia | H04N 21/44224 |
| 11,308,537 B1 * | 4/2022 | Bell | G06Q 30/0629 |
| 2014/0046946 A2 | 2/2014 | Friedmann et al. | |
| 2020/0410535 A1 | 12/2020 | Manohar et al. | |

(Continued)

OTHER PUBLICATIONS

Shah et al., "Estimation from Pairwise Comparisons: Sharp Minimax Bounds with Topology Dependence", Proceedings of the 18th International Conference on Artificial Intelligence and Statistics (AISTATS) 2015, San Diego, CA, USA JMLR: W&CP vol. 38 (Year: 2015).*

(Continued)

*Primary Examiner* — Ethan D Civan
(74) *Attorney, Agent, or Firm* — Morgan, Lewis & Bockius LLP; Manita Rawat

(57) ABSTRACT

An optimized substitution system can include a computing device that is configured to receive a notification indicating an order and a first item identifier and, based on the first item identifier, identify a set of substitute item identifiers. Each substitute item identifier of the set of substitute item identifiers includes a probability value using an optimization computation based on a similarity and a value of the corresponding set of substitute item identifiers and the first item identifier. The similarity and the value are stored in a database. The compute device is also configured to, based on the probability values corresponding to the set of substitute item identifiers, select a first substitute item identifier of the set of substitute item identifiers and update the order to include the first substitute item identifier and exclude the first item identifier.

17 Claims, 6 Drawing Sheets

(56) References Cited

U.S. PATENT DOCUMENTS

2021/0110455 A1    4/2021   Lundgaard
2021/0312526 A1   10/2021   Xu et al.

OTHER PUBLICATIONS

Shah, et al., "Estimation from Pairwise Comparisons: Sharp Minimax Bounds with Topology Dependence", Proceedings of the 18th International Conference on Artificial Intelligence and Statistics (AISTATS) 2015, San Diego, CA, USA. JMLR: W&CP vol. 38.

* cited by examiner

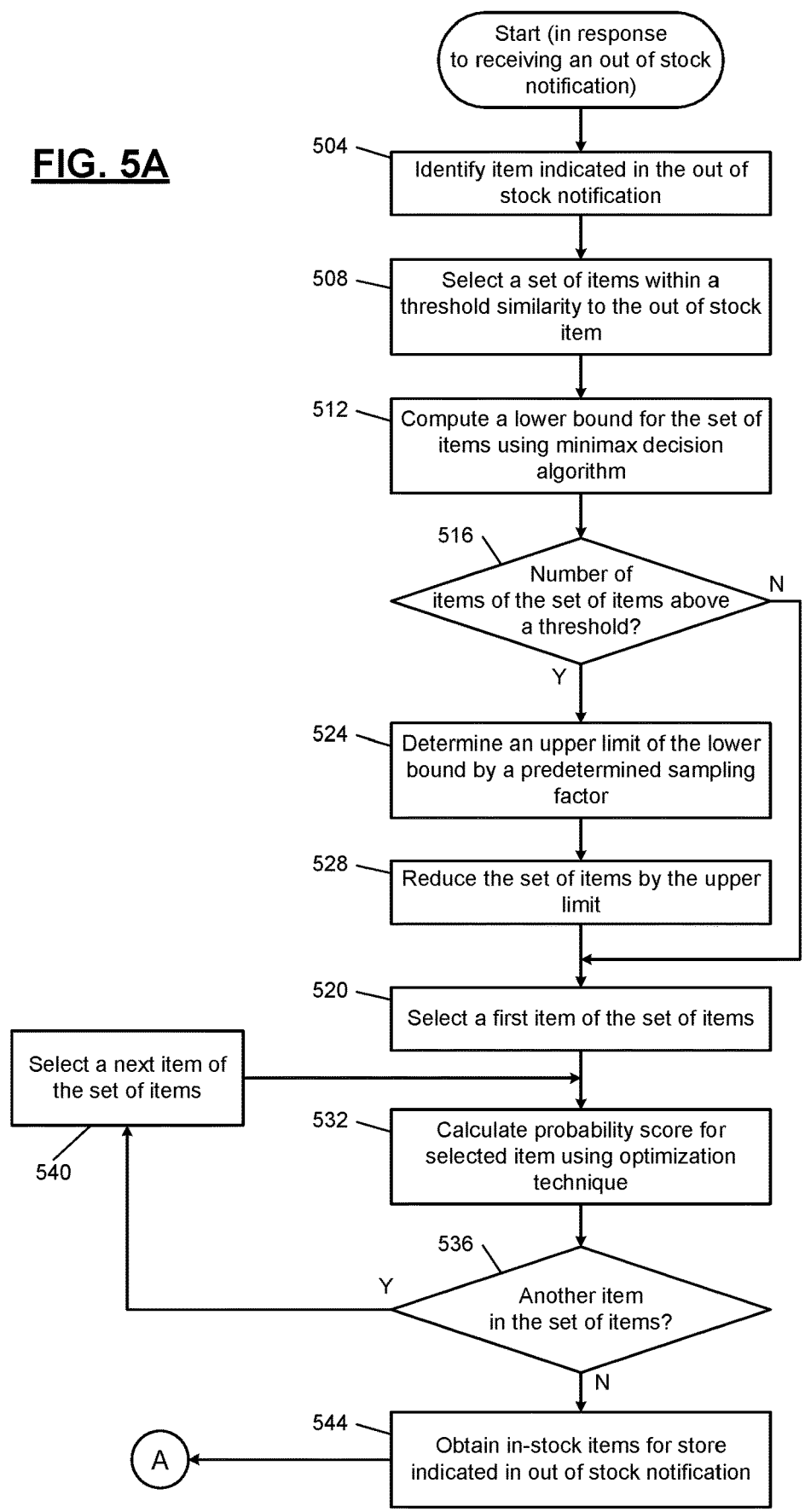

SYSTEMS AND METHODS FOR BI-LEVEL OPTIMIZATION OF STOCHASTIC RECOMMENDATIONS

TECHNICAL FIELD

The disclosure relates generally to systems and methods for generating bi-level recommendations based on relevance and value and more particularly to stochastic recommendations of items with value optimization.

BACKGROUND

Various ecommerce platforms offer online shopping in a variety of forms. One form is allowing customers or users to place an order for in-store items from a particular store corresponding with an ecommerce platform and receiving those items in a form of shipment or delivery. For example, the user could request same day delivery of a particular basket of items that are for sale at the particular store.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The embodiments described herein are directed to an optimized substitution system and related methods. The optimized substitution system can include a computing device that is configured to receive a notification indicating an order and a first item identifier and, based on the first item identifier, identify a set of substitute item identifiers. Each substitute item identifier of the set of substitute item identifiers includes a probability value using an optimization computation based on a similarity and a value of the corresponding set of substitute item identifiers and the first item identifier. The similarity and the value are stored in a database. The compute device is also configured to, based on the probability values corresponding to the set of substitute item identifiers, select a first substitute item identifier of the set of substitute item identifiers and update the order to include the first substitute item identifier and exclude the first item identifier.

In another aspect, the computing device is configured to, prior to updating the order, generate and transmit an out of stock notification to a user device associated with the order, update the order to exclude the first item identifier in response to receiving a reject indication from the user device, and update the order to include the first substitute item identifier and exclude the first item identifier in response to receiving an accept indication from the user device.

In another aspect, the computing device is configured to update the similarity between the first item identifier and the first substitute item identifier in the database based on receiving at least one of the accept indication and the reject indication.

In another aspect, the optimization computation includes selecting the set of substitute item identifiers based on a similarity score between each of the substitute item identifiers and the first item identifier, computing a lower bound using a minimax decision algorithm, and computing a probability score for each substitute item identifier of the set of substitute item identifiers based on the lower bound, a value of corresponding items, the similarity score, and a substitution acceptance rate.

In another aspect, selecting the first substitute item identifier includes selecting the first substitute item identifier according to a weighting of the probability values of the set of substitute item identifiers.

In another aspect, the computing device is configured to obtain a set of in-store item identifiers corresponding to a store associated with the order and filter the set of substitute item identifiers based on the set of in-store item identifiers.

In another aspect, the first substitute item identifier is selected using a random sampling approach of the corresponding probability values.

In various embodiments of the present disclosure, a method of optimized substitution of items is provided. In some embodiments, the method can include receiving a notification indicating an order and a first item identifier and, based on the first item identifier, identifying a set of substitute item identifiers. Each substitute item identifier of the set of substitute item identifiers includes a probability value using an optimization computation based on a similarity and a value of the corresponding set of substitute item identifiers and the first item identifier. The similarity and the value are stored in a database. The method also includes, based on the probability values corresponding to the set of substitute item identifiers, selecting a first substitute item identifier of the set of substitute item identifiers and updating the order to include the first substitute item identifier and exclude the first item identifier.

In various embodiments of the present disclosure, a non-transitory computer readable medium is provided. The non-transitory computer readable medium can have instructions stored thereon, wherein the instructions, when executed by at least one processor, cause a device to perform operations that include receiving a notification indicating an order and a first item identifier and, based on the first item identifier, identifying a set of substitute item identifiers. Each substitute item identifier of the set of substitute item identifiers includes a probability value using an optimization computation based on a similarity and a value of the corresponding set of substitute item identifiers and the first item identifier. The similarity and the value are stored in a database. The operations also include, based on the probability values corresponding to the set of substitute item identifiers, selecting a first substitute item identifier of the set of substitute item identifiers and updating the order to include the first substitute item identifier and exclude the first item identifier.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The features and advantages of the present disclosures will be more fully disclosed in, or rendered obvious by, the following detailed descriptions of example embodiments. The detailed descriptions of the example embodiments are to be considered together with the accompanying drawings wherein like numbers refer to like parts and further wherein:

FIGS. 5A and 5B are flowcharts of example methods of determining a substitute item for an out of stock item in accordance with some embodiments.

In the drawings, reference numbers may be reused to identify similar and/or identical elements.

DETAILED DESCRIPTION

Figure 1:
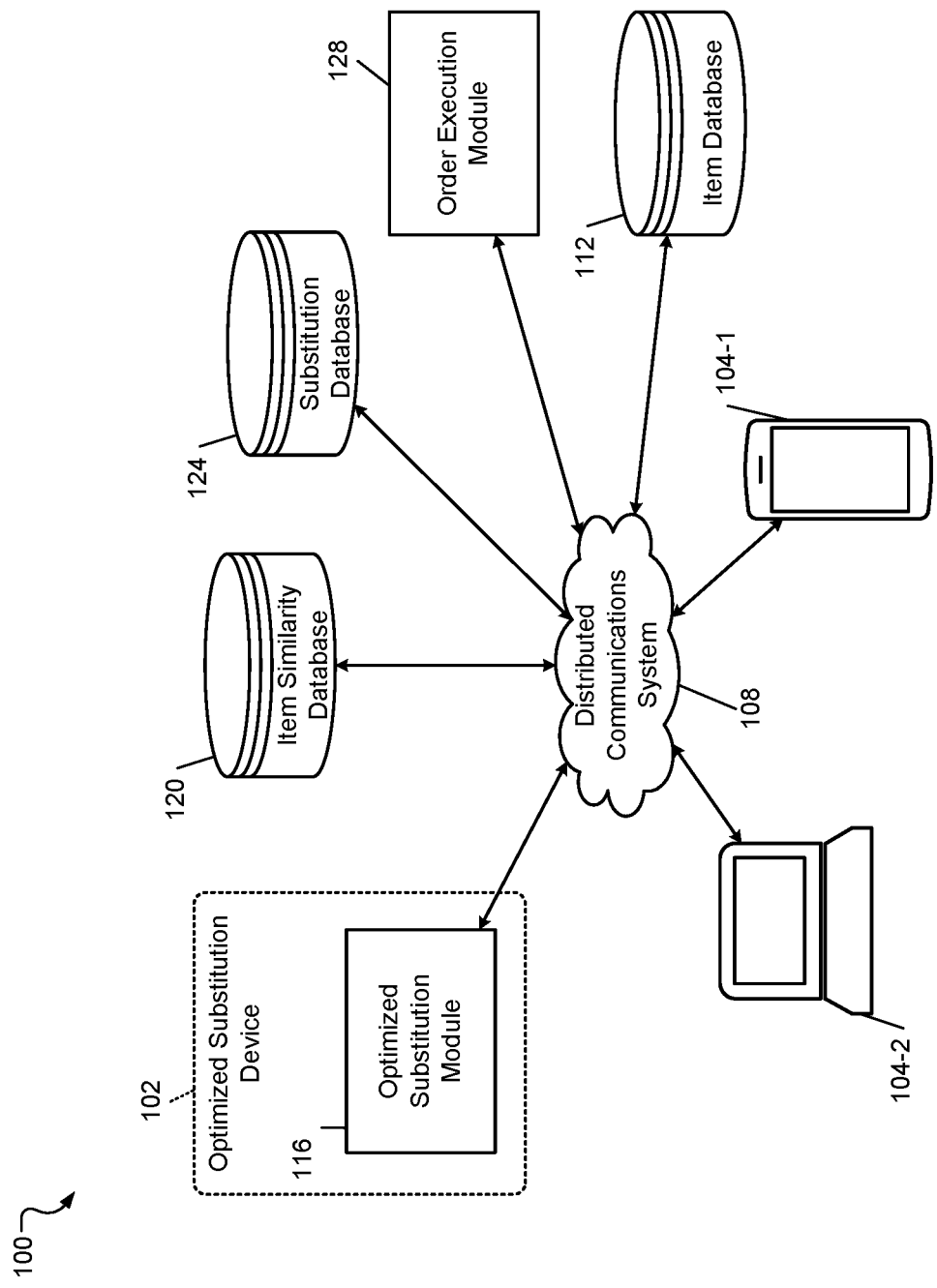
FIG. 1 is a block diagram of an optimized substitution system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "connected," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

An optimized substitution system may be implemented to generate a substitute item when an item within a user or customer's order is out of stock. For example, a customer may have placed an order to receive delivery of a set of items from a particular store via an associated ecommerce website or platform. If, when an associate working for the store, realizes one or more of the items within the particular order for the customer is out of stock, the associate may, using an associate or analyst device that is displaying the customer order, select a user interface button to generate and transmit an out of stock notification for each item that is out of stock. For example, via the user interface of the analyst device, the associate may be presented with a list of items of the customer order. The associate may gather those items to have delivered to the customer, for example, via delivery or pick up. On the user interface next to each item may be an icon the associate may select to generate the out of stock notification for one or more of the items.

Originally, the associate would suggest a substitute item to send to the customer for approval. However, this process may be time consuming as well as cost or revenue consuming. For example, in various implementations, if the substitute item is more expensive than the item the customer originally selected, the particular store or the ecommerce website may cover the difference in additional cost to ensure customer satisfaction, resulting in a profit loss. Further, in various implementations, if the associate were to identify and suggest a substitute item of lesser value, the customer would only be charged the price of the item of lesser value; however, this results in a revenue loss for the particular store. Therefore, ensuring that the substitute item is as close to the original price as possible reduces any lost profits or lost revenue. However, maintaining a relevance or a similarity between the original item and the substitute item is very important to customer satisfaction and acceptance, which the optimized substitution system does not compromise while optimizing the cost difference.

To improve upon the automation, relevance, and optimized cost of the substitute item, the optimized substitution system implements bi-level cost optimization with stochastic selections of the substitute item. That is, the optimized substitution system identifies a set of items that are similar or relevant to the out of stock item. For example, a database may include similarity scores between various items across a variety of stores based on brand, item type, item price, item size (either weight, number of items in a box, etc.), a substitution acceptance rate between items, etc. In various implementations, the optimized substitution system only selects those items above a similarity threshold. From those items, the items are filtered to reduce the potential revenue and profit losses described above by using a minimax decision rule to limit the potential loss. For the set of items, a lower bound is determined to optimize the cost of the available substitute options, that is, the set of items. The lower bound is used to determine and compute a probability score of substituting each item of the set of items, and the optimized substitution system further ensures the probability score is greater than the lower bound.

Once the probability scores for each item are determined, the optimized substitution system selects a substitute item based on the probability scores of each item of the set of items. For example, the optimized substitution system selects the substitute item at the frequency indicated by the probability scores of the remaining set of items using a random sampling approach (e.g., if a first substitute item probability score is 0.5, a second substitute item probability score is 0.35, and a third substitute item probability score 0.25, the optimized substitution system selects the substitute item according to the percentage of the scores when presented with the particular substitution). In various implementations, the optimized substitution system also filters the set of items based on those items existing at the particular store corresponding to the order.

Once selected, the substitute item may be sent to an analyst device for approval by an associate. The associate may approve the selection or may reject the selection and then another substitute item may be presented to the analyst device. Once a substitute item is approved, the optimized substitution system sends the substitute item to a user device for user or customer approval. The user may agree to the substitute item or reject the substitute item. The order is updated based on the user selection as is an item similarity database and a substitution database to update the acceptance rate of the substitute item for the out of stock item. In various implementations, the selection made on the analyst device may also be added to the different databases to incorporate actual analyst and user feedback.

Referring to FIG. 1, a block diagram of an optimized substitution system 100 is shown. The optimized substitution system 100 may include an optimized substitution device 102 and user device 104-1 and analyst device 104-2, which can be a phone, tablet, laptop, mobile computing device, desktop, etc., capable of communicating with a plurality of databases and modules via a distributed communications system 108. The user device 104-1 may display an ecommerce marketplace via a web browser or an application for customers to view items for sale by the ecommerce marketplace that are stored in an item database 112. For example, a customer may browse a webpage being displayed on a graphical user interface of the user device 104-1 and/or submit a query through the graphical user interface of the user device 104-1 on the ecommerce marketplace through a web browser or application, which retrieves a subset of items from the item database 112 that pertain to the query and displays the subset of items to the customer via the graphical user interface of the user device 104-1. For example, the user may search for weekly groceries and add them to a basket or the order for purchase.

The optimized substitution system 100 also includes an optimized substitution module 116. The optimized substitution system 100 also includes an item similarity database 120 and a substitution database 124. The item similarity database 120 may store data indicating a similarity between a plurality of items stored in the item database 112. For example, a numerical similarity score between 0 and 1 for each item, may be stored, which can be further reduced or increased based on acceptance feedback from a user. That is, when a user accepts a first item in place of a second item, the acceptance feedback increases the similarity score between the two items, indicting them as an acceptable substitute for the other. The optimized substitution system 100 tracks a global acceptance rate for all users as well as specific acceptance rates to each user.

Figure 4:
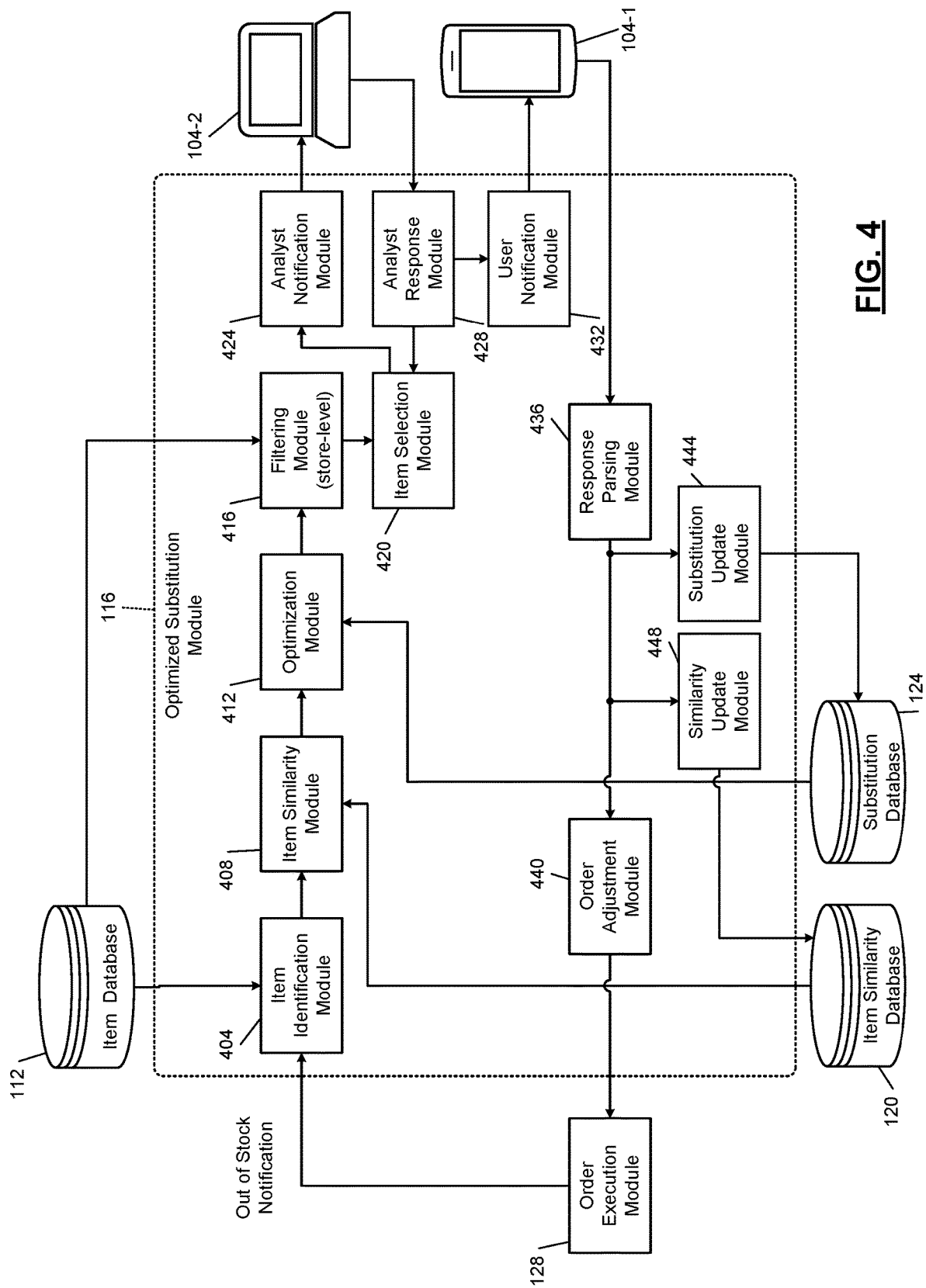
FIG. 4 is a block diagram illustrating an example optimized substitution module of the optimized substitution system of FIG. 1 in accordance with some embodiments.
Figure 5B:
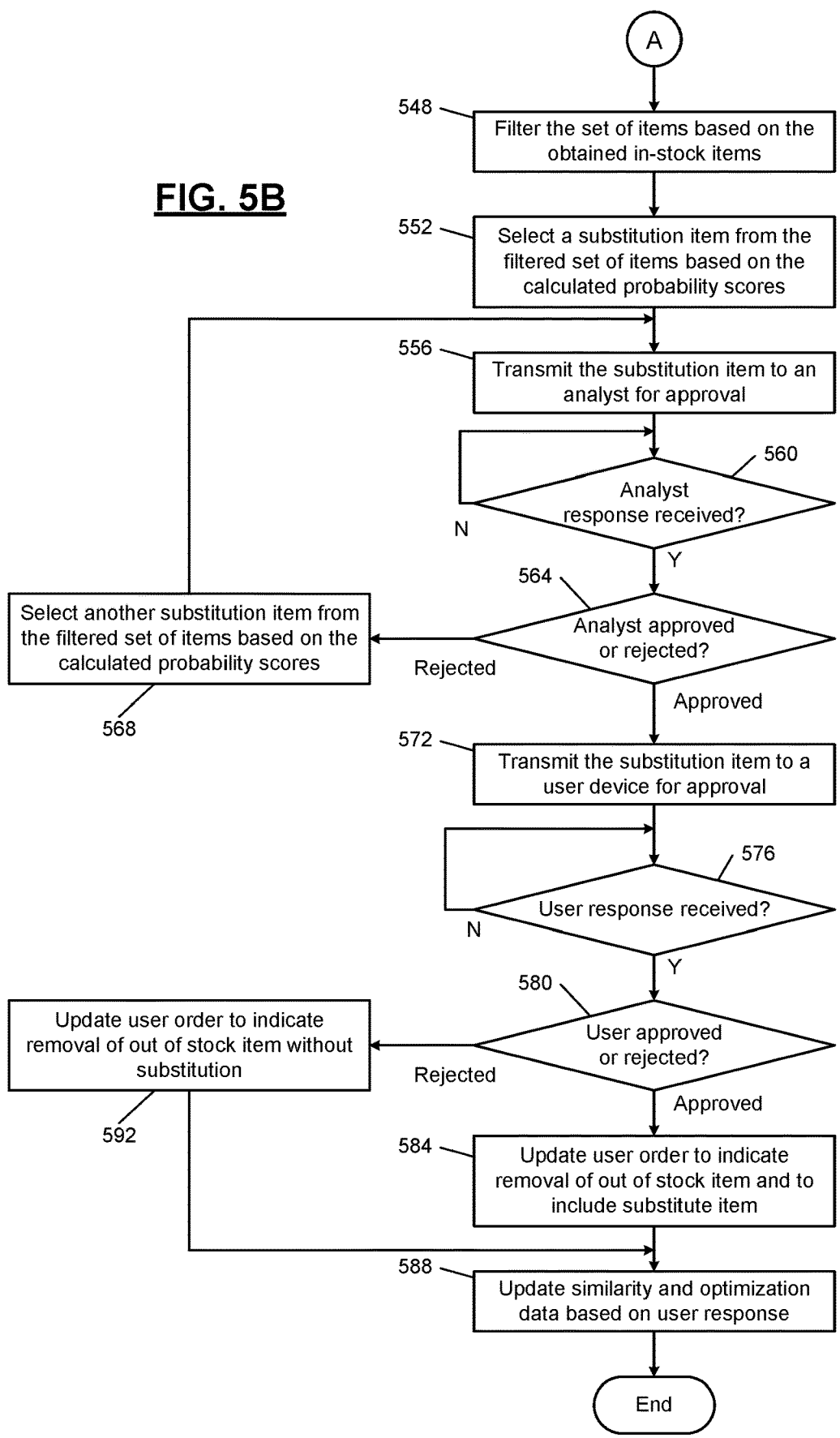

The substitution database 124 may store data used to determine the probability scores for potentially substituted items during optimization. For example, the substitution database 124 may store acceptance rates for different items, cost of items, etc. Further, as discussed below, in an implementation where the optimized substitution system 100 predetermines the probability scores for substituting each item within the ecommerce platform, the substitution database 124 may score the probability scores and the corresponding set of items that may replace every other item. As is shown in FIGS. 4-5B, the present disclosure depicts the probability scores being calculated in real time, but the probability scores may be calculated at pre-determined intervals, such as daily. The optimized substitution system 100 also includes an order execution module 128, which may be implemented by the analyst device 104-2, and is configured to receive orders from users as well as generate and transmit out of stock notifications.

As indicated above, the optimized substitution device 102, the user device 104-1, and/or the analyst device 104-2 can be a computer, a workstation, a laptop, a server such as a cloud-based server, or any other suitable device. In some examples, the optimized substitution device 102, the user device 104-1, and/or the analyst device 104-2 can be a cellular phone, a smart phone, a tablet, a personal assistant device, a voice assistant device, a digital assistant, a laptop, a computer, or any other suitable device. In various implementations, the optimized substitution device 102 is on a central computing system that is operated and/or controlled by a retailer. Additionally or alternatively, the modules and databases of the optimized substitution device 102 are distributed among one or more workstations or servers that are coupled together over the distributed communications system 108.

The databases described can be remote storage devices, such as a cloud-based server, a memory device on another application server, a networked computer, or any other suitable remote storage. Further, in some examples, the databases can be a local storage device, such as a hard drive, a non-volatile memory, or a USB stick.

The distributed communications system 108 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The distributed communications system 108 can provide access to, for example, the Internet.

Figure 2:
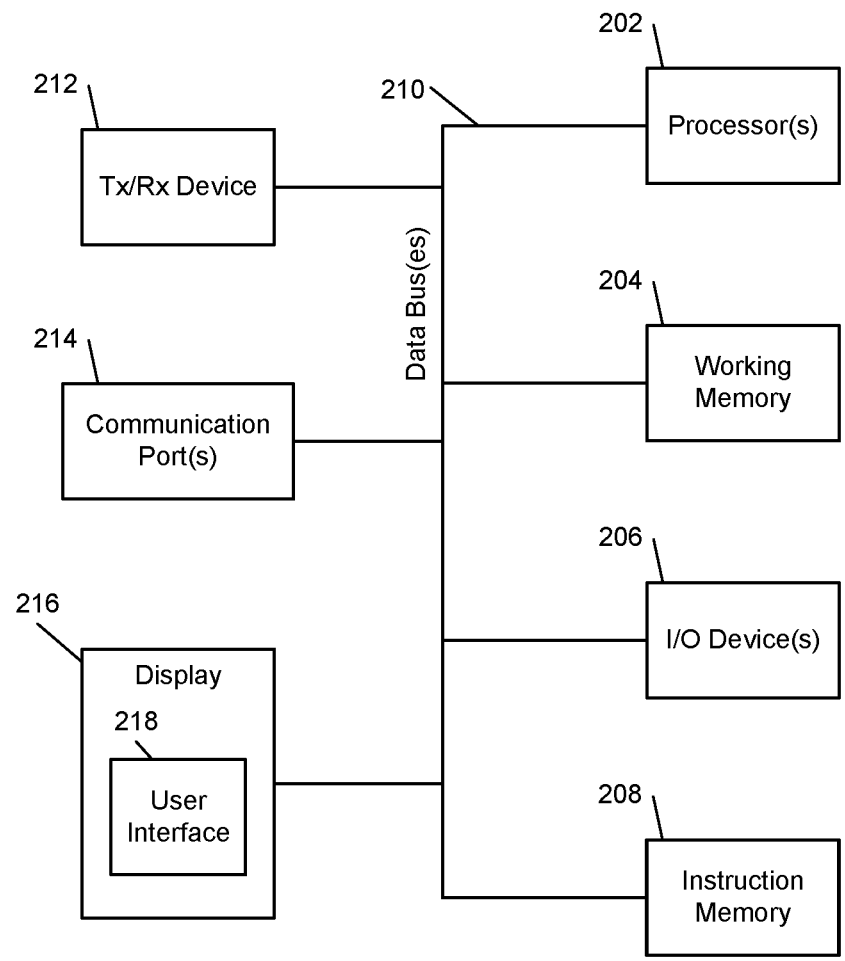
FIG. 2 is a block diagram of a computing device implementing the optimized substitution device of FIG. 1 in accordance with some embodiments.

FIG. 2 illustrates an example computing device 200. The optimized substitution device 102, the user device 104-1, and/or the analyst device 104-2 may include the features shown in FIG. 2. For the sake of brevity, FIG. 2 is described relative to the optimized substitution device 102.

As shown, the optimized substitution device 102 can be a computing device 200 that may include one or more processors 202, working memory 204, one or more input/output devices 206, instruction memory 208, a transceiver 212, one or more communication ports 214, and a display 216, all operatively coupled to one or more data buses 210. Data buses 210 allow for communication among the various devices. Data buses 210 can include wired, or wireless, communication channels.

Processors 202 can include one or more distinct processors, each having one or more cores. Each of the distinct processors can have the same or different structure. Processors 202 can include one or more central processing units (CPUs), one or more graphics processing units (GPUs), application specific integrated circuits (ASICs), digital signal processors (DSPs), and the like.

Processors 202 can be configured to perform a certain function or operation by executing code, stored on instruction memory 208, embodying the function or operation. For example, processors 202 can be configured to perform one or more of any function, method, or operation disclosed herein.

Instruction memory 208 can store instructions that can be accessed (e.g., read) and executed by processors 202. For example, instruction memory 208 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 202 can store data to, and read data from, working memory 204. For example, processors 202 can store a working set of instructions to working memory 204, such as instructions loaded from instruction memory 208. Processors 202 can also use working memory 204 to store dynamic data created during the operation of the optimized substitution device 102. Working memory 204 can be a random access memory (RAM) such as a static random access memory (SRAM) or dynamic random access memory (DRAM), or any other suitable memory.

Input-output devices 206 can include any suitable device that allows for data input or output. For example, input-output devices 206 can include one or more of a keyboard, a touchpad, a mouse, a stylus, a touchscreen, a physical button, a speaker, a microphone, or any other suitable input or output device.

Communication port(s) 214 can include, for example, a serial port such as a universal asynchronous receiver/transmitter (UART) connection, a Universal Serial Bus (USB)

connection, or any other suitable communication port or connection. In some examples, communication port(s) 214 allows for the programming of executable instructions in instruction memory 208. In some examples, communication port(s) 214 allow for the transfer (e.g., uploading or downloading) of data, such as data items including feedback information.

Display 216 can display a user interface 218. User interfaces 218 can enable user interaction with the optimized substitution device 102. For example, user interface 218 can be a user interface that allows an operator to select and browse items via the ecommerce website or marketplace. The user interface 218 can, for example, display the items for sale for a user or customer view as a result of searching or browsing on an ecommerce marketplace. In some examples, display 216 can be a touchscreen, where user interface 218 is displayed on the touchscreen.

Transceiver 212 allows for communication with a network, such as the distributed communications system 108 of FIG. 1. For example, if the distributed communications system 108 of FIG. 1 is a cellular network, transceiver 212 is configured to allow communications with the cellular network. In some examples, transceiver 212 is selected based on the type of distributed communications system 108 in which the optimized substitution device 102 will be operating. Processor(s) 202 is operable to receive data from, or send data to, a network, such as the distributed communications system 108 of FIG. 1, via transceiver 212.

Figure 3:
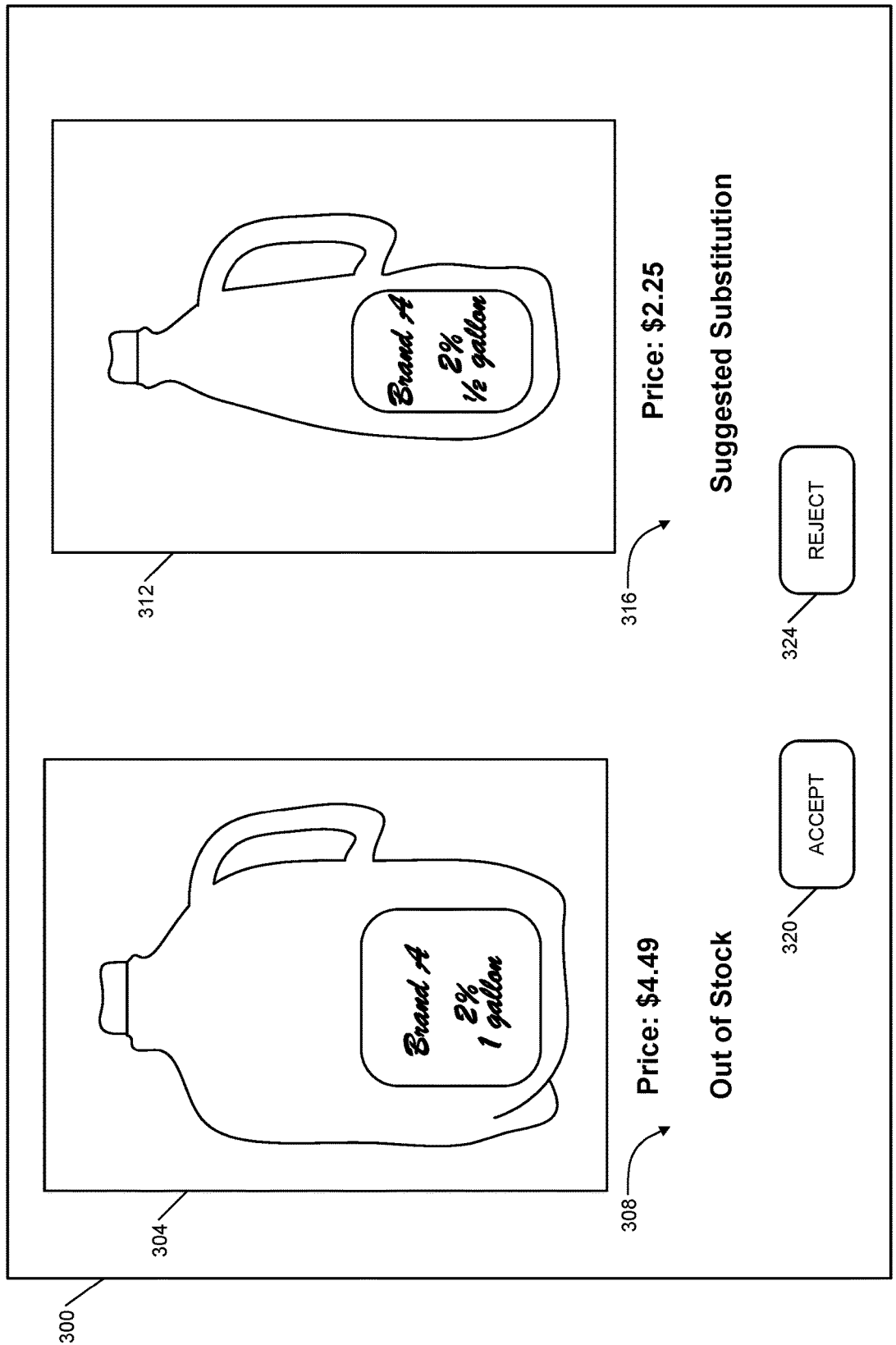
FIG. 3 is a graphical user interface depicting example substituted items for display to a user of an ecommerce marketplace in accordance with some embodiments.

Referring now to FIG. 3, a graphical user interface 300 depicting example substituted items for display to a user of an ecommerce marketplace is shown. For example, if a first item 304 that the user selected and included in an order is determined to be out of stock as indicated in a first item information area 308, the optimized substitution system 100 identifies a substitute item 312 based on relevant attributes of the first item 304 and presents the substitute item 312 to the user. As shown in FIG. 3, the user may be shown the first item 304 next to the substitute item 312 with substitute item information 316, which may include a price as well as information about the item not found in the photograph (for example, the brand may be included below, size, price per quantity, etc.). The user may compare the two items. In this case, the item is identical except for the size and the price, the price being only half of a cent more than the gallon size. The user can select an accept button 320 on the user interface (for example, on the user device displaying the suggested substitution) or a reject button 324 to transmit the corresponding acceptance or rejection to the optimized substitution system 100. Once the acceptance or rejection is received, the order is updated accordingly.

Referring now to FIG. 4, a block diagram illustrating an example optimized substitution module 116 of the optimized substitution system 100 is shown. The optimized substitution module 116 includes an item identification module 404 that receives an out of stock notification from the order execution module 128 upon an associate determining that one of the items in a user's order is out of stock. The item identification module 404 parses the out of stock notification to determine an item identifier and obtain relevant parameters of the item identifier from the item database 112, such as brand, size, price, etc. The item identification module 404 forwards the item identifier and corresponding parameters to an item similarity module 408. The item similarity module 408 identifies a set of items that are similar to or could be used as substitutes for the item identifier based on data stored in the item similarity database 120.

For example and as noted above, the item similarity database 120 may store similarity scores for each pair of items offered by an ecommerce marketplace. The similarity score between items is determined based on item type, brand, size, etc. as well as user acceptance feedback, indicating whether one item is an appropriate substitute for another item. The item similarity module 408 forwards the identified set of item identifiers, for example, those item identifiers corresponding to a similarity score with the item identifier above a threshold, such as 90% similar, to an optimization module 412. The optimization module 412 performs optimization calculations on the set of item identifiers using data stored in the substitution database 124. For example, the optimization module 412 may first implement a minimax decision algorithm using a cost or value of each of the item identifiers of the set of item identifiers stored in the substitution database 124 to remove any item identifiers exceeding a difference in value from the out of stock item identifier. Implementing the minimax decision algorithm ensures any lost profits or lost revenue is minimized.

Then, the optimization module 412 may calculate a lower bound for substitutes using the following equations by implementing constrained linear programming (LP):

$LP$:

$$\text{minimize} \sum_{u=0}^{U} \sum_{i=0}^{n} \sum_{j=0}^{s_i} \left( p_{u,i,j} - \frac{1}{s_i} \right)^2$$

such that $$\sum_{j=0}^{s_i} p_{u,i,j} = 1, \forall i \in n, \forall u \in U$$

$$N = \sum_{u=0}^{U} \sum_{i=0}^{n} \eta_{u,i}$$

$$\sum_{u=0}^{U} \sum_{i=0}^{n} \sum_{j=0}^{s_i} \frac{p_{u,i,j} * \eta_{u,i} * a_{u,i,j}}{N} \geq A$$

where u is the user, n is a number of out of stock items, i is the out of stock item, j is the potential substitute item of the set of item identifiers, p is the probability score (meaning $p_{u,i,j}$ is the probability score of substituting item i with potential substitute item j for user u), s is a number of items of the set of items (that is, $s_i$ is the number of potential substitutes for item i), $\eta_{u,i}$ is the number of times user u ordered item i, $a_{u,i,j}$ is the user u acceptance rate of substituting item i with potential substitute item j, and A is a global acceptance rate limit.

Then, the optimization module 412 determines the lower bound (LB) for each user u for out of stock item i according to:

$$LB_{u,i} = \min(p_{u,i,j}, \lambda), \forall i \in n, \forall u \in V$$

where $\lambda$ is a maximum exploration factor, which may be predetermined based on the minimax decision algorithm determining a maximum exploration amount or value. To determine the probability score p, the optimization module 412 continues the optimization to ensure the cost difference is incorporated according to the following equations:

minimize $$\sum_{u=0}^{U}\sum_{i=0}^{n}\sum_{j=0}^{s_i} p_{u,i,j} * a_{u,i,j} * c_{i,j} * n_{u,i}$$

such that $$\sum_{j=0}^{s_i} p_{u,i,j} = 1, \forall i \in n, \forall u \in U$$

$$\sum_{u=0}^{U}\sum_{i=0}^{n}\sum_{j=0}^{s_i} \frac{p_{u,i,j} * \eta_{u,i} * a_{u,i,j}}{N} \geq A$$

where $c_{i,j}$ is the cost of substituting item i with potential substitute item j. The optimization module 412 solves the equations to determine $p_{u,i,j}$ and identifies potential substitutes from the set of item identifiers as only those with a probability score $p_{u,i,j}$ above $LB_{u,i}$, as shown below:

$$p_{u,i,j} \geq LB_{u,i}, \forall i \in n, \forall u \in U$$

In various implementations, the optimization module 412 computations are run prior to receiving the out of stock notification and the corresponding probability scores are stored in the substitution database 124. That is, the optimization computations above are run at daily, predetermined intervals and are stored in the substitution database 124, indexed by out of stock item identifier. In such a case, the optimization module 412 obtains the probability scores of the identified set of items. Then, the set of items and probability scores are forwarded to a filtering module 416. The filtering module 416 may compare the set of item identifiers with items currently stocked at a store corresponding to the order associated with the out of stock notification. In various implementations, the item database 112 stores which items are presently available in each store. Additionally or alternatively, the filtering module 416 may access a database at the corresponding store to determine which items are currently in stock.

The filtered set of item identifiers are forwarded to an item selection module 420, which selects a substitute item based on the probability scores. For example, the set of item identifiers may include a set of three potential substitute items with probability scores of 50%, 35%, and 25%. Moreover, the price difference between the out of stock item and the set of item identifiers may be 40 cents, 60 cents, and $1. The item selection module 420 selects the substitute item using a roulette approach, weighting the pseudo-random selection based on the determined probability scores. For example, the item selection module 420 may implement a random sampling approach based on the percentage of the probability scores. Once the substitute item is selected, the item selection module 420 forwards the substitute item identifier to an analyst notification module 424 that generates and transmits a notification identifying the select substitute item to the analyst device 104-2. In various implementations, the optimized substitution module 116 may skip acceptance by the analyst and directly send the selected substitution item to the user device 104-1 associated with the order.

At the analyst device 104-2, an analyst associated with the store or the ecommerce marketplace may confirm the selection of the substitute item and send the confirmation to an analyst response module 428 of the optimized substitution module 116. The analyst response module 428 parses the response and either forwards an identified rejection back to the item selection module 420 to identify a different substitute item or an acceptance/confirmation to a user notification module 432. The user notification module 432 generates and transmits a notification identifying the substitute item to the user device 104-1, also indicting the item the user ordered is out of stock (for example, as shown in FIG. 3). The user may select an acceptance or a rejection on the user interface of the user device 104-1, which is transmitted to a response parsing module 436 of the optimized substitution module 116. The response parsing module 436 forwards the response to an order adjustment module 440, a substitution update module 444, and a similarity update module 448. The order adjustment module 440 updates the order in the order execution module 128 according to the user acceptance or rejection.

The substitution update module 444 updates the substitution database 124 with the feedback from the user to incorporate into the acceptance rate of the different items. Additionally, the similarity update module 448 updates the similarity score between items in the item similarity database 120 according to user acceptance or rejection. As noted above, in various implementations, the optimization module 412 may be separate from the optimized substitution module 116 and determine probabilities for potential substitutions of an item at predetermined intervals, for example, each day, and update and store the probability scores for each potential substitution in the substitution database 124. Further, the optimization module 412 may further generate customer cohorts based on similarities between users and incorporate acceptance rates from users within the same cohort in the optimization process. For example, the various cohorts could be users who purchase gluten free items, users with average orders below a particular price, etc.

Moreover, the optimization module 412 may be implemented regionally to consider data within particular regions due to price differences in different areas. That is, an optimization module may operate using east coast data, west coast data, southern data, and Midwestern data to differentiate between different regional price expectations. Additionally or alternatively, the optimization module 412 may weigh relevance versus value based on the type of item. For example, a particular type of item, such as spices, diapers, high-priced items, etc., the relevance to the originally selected item may be more important to the user, which in turn results in the cost optimization being less important, since substitutes closer to the price may not be similar enough. Further, the relevance may be more important for an item in a user's order that accounts for half the price of the entire order, meaning the user may want an item that is most similar to the item they originally intended to purchase.

Referring now to FIGS. 5A and 5B, flowcharts of example methods of determining a substitute item for an out of stock item are shown. Control begins in response to receiving an out of stock notification, for example, from an order execution module or device (such as an analyst device). Control continues to 504 to identify the item indicated in the out of stock notification. Control proceeds to 508 to select a set of items within a threshold similarity to the out of stock item. Then, control continues to 512 to compute a lower bound for the set of items using the minimax decision algorithm described above to minimize any potential loss. Control proceeds to 516 to determine if the number of items of the set of items is above a threshold. That is, control only reduces the number of similarity items if there are enough similar items, for example, over five items. If there are not enough items to be above the threshold, control proceeds to 520 to select a first item of the set of items. Otherwise, if the number of items of the set of items are above the threshold, control continues to 524 to determine an upper limit of the lower bound by a predetermined sampling factor. Control continues to 528 to reduce the set of items by the upper limit and then continues to 520 to select the first item of the set of items.

Control then proceeds to 532 to calculate a probability score for the selected item using the optimization technique in the equations described above. At 536, control determines if another item is in the set of items. If yes, control proceeds to 540 to select a next item of the set of items and returns to 536. Otherwise, if another item is not in the set of items, control proceeds to 544 to obtain in-stock items for the store indicated in the out of stock notification. As noted previously, in various implementations, steps 504 through 536 may be performed for each item in a plurality of stores at predetermined intervals, for example, daily, and the probability scores for the similar items of each item may be stored in a database. In such implementation, control simply obtains the probability scores of the similar items of the out of stock item in response to receiving the out of stock notification and proceeds to step 544.

Once the in-stock items for the store indicated in the out of stock notification are obtained, control continues to 548 to filter the set of items based on the obtained in-stock items, removing any items of the set of items that do not appear in the obtained in-stock items. Control proceeds to 552 to select a substitution item from the filtered set of items based on the calculated probability scores. That is, control selects the substitute item pseudo-randomly based on one frequency at which each item should be selected to maintain the corresponding acceptance rate and relevance for the out of stock item while minimizing profit and revenue loss—that is, according to the probability scores.

Control continues to 556 to transmit the substitution item to an analyst for approval. As noted previously, control may instead directly send the substitution item to the user without requesting analyst approval. At 560, control waits to receive an analyst response, for example, from the analyst device. Once received, control proceeds to 564 to determine if the analyst approved or rejected the substitution item. If the substitution item was rejection, control continues to 568 to select another substitution item from the filtered set of items based on the calculated probability scores and returns to 556. Otherwise, if the analyst approved the substitution item, control proceeds to 572 to transmit the substitution item to the user device for approval. The user device corresponds to the device that submitted to original order that resulted in an out of stock notification.

Control continues to 576 to wait for a user response. Once received, control determines if the user approved or rejected the substitution item. If the substitution item is approved, control continues to 584 to update the user order to indicate removal of the out of stock item and to include the substitute item. Then, control proceeds to 588 to update the similarity and optimization data based on the user response and control ends. In various implementations, the similarity and optimization data may also be updated based on the analyst response. Otherwise, if at 580 control determines the user rejected the substitution item, control continues to 592 to update the user order to indicate removal of the out of stock item without substitution. Then, control continues to 588 to update the data and ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The term model as used in the present disclosure includes data models created using machine learning. Machine learning may involve training a model in a supervised or unsupervised setting. Machine learning can include models that may be trained to learn relationships between various groups of data. Machine learned models may be based on a set of algorithms that are designed to model abstractions in data by using a number of processing layers. The processing layers may be made up of non-linear transformations. The models may include, for example, artificial intelligence, neural networks, deep convolutional and recurrent neural networks. Such neural networks may be made of up of levels of trainable filters, transformations, projections, hashing, pooling and regularization. The models may be used in large-scale relationship-recognition tasks. The models can be created by using various open-source and proprietary machine learning tools known to those of ordinary skill in the art.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
a computing device configured to:
receive, by an item identification module, a notification indicating an order and a first item identifier;
based on the first item identifier, identify, by an item similarity module, a set of substitute item identifiers, each substitute item identifier of the set of substitute item identifiers including a similarity score determined by an optimization computation including at least a minimax decision algorithm, wherein the similarity score is updated by at least a substitution acceptance rate, and wherein the similarity score and the substitution acceptance rate value are stored in a database;

determine a lower bound for the similarity score of
   each of the substitute item identifiers in the set of
   substitute item identifiers by implementing a con-
   strained linear programming based on at least a
   maximum exploration factor;
determine a probability value for each of the substitute
   item identifiers of the set of substitute item identifiers
   based on the lower bound, a value of corresponding
   items, the similarity score, and the substitution
   acceptance rate;
based on the probability values and the similarity score
   corresponding to the set of substitute item identifiers,
   select a first substitute item identifier of the set of
   substitute item identifiers;
transmit, to an analyst device, instructions causing
   generation of a user interface including the first
   substitute item identifier and the first item identifier;
receive, from the analyst device, an indication the of
   approval for the first substitute item identifier; and
in response to receiving the indication of approval,
   update the order to include the first substitute item
   identifier and exclude the first item identifier.

2. The system of claim 1, wherein the computing device is configured to:
prior to updating the order, generate and transmit an out of stock notification to a user device associated with the order;
update the order to exclude the first item identifier in response to receiving a reject indication from the user device; and
update the order to include the first substitute item identifier and exclude the first item identifier in response to receiving an accept indication from the user device.

3. The system of claim 2, wherein the computing device is configured to:
update the similarity between the first item identifier and the first substitute item identifier in the database based on receiving at least one of the accept indication and the reject indication.

4. The system of claim 1, wherein selecting the first substitute item identifier includes selecting the first substitute item identifier according to a weighting of the probability values of the set of substitute item identifiers.

5. The system of claim 1, wherein the computing device is configured to:
obtain a set of in-store item identifiers corresponding to a store associated with the order; and
filter the set of substitute item identifiers based on the set of in-store item identifiers.

6. The system of claim 1, wherein the first substitute item identifier is selected using a random sampling approach of the corresponding probability values.

7. A method comprising:
receiving, by an item identification module, a notification indicating an order and a first item identifier;
based on the first item identifier, identifying, by an item similarity module, a set of substitute item identifiers, each substitute item identifier of the set of substitute item identifiers including a similarity score determined by an optimization computation including at least a minimax decision algorithm, wherein the similarity score is updated by at least a substitution acceptance rate, and wherein the similarity score and the substitution acceptance rate value are stored in a database;
determining a lower bound for the similarity score of each of the substitute item identifiers in the set of substitute item identifiers by implementing a constrained linear programming based on at least a maximum exploration factor;
determining a probability value for each of the substitute item identifiers of the set of substitute item identifiers based on the lower bound, a value of corresponding items, the similarity score, and the substitution acceptance rate;
based on the probability values and the similarity score corresponding to the set of substitute item identifiers, selecting a first substitute item identifier of the set of substitute item identifiers;
transmitting, to an analyst device, instructions causing generation of a user interface including the first substitute item identifier and the first item identifier;
receiving, from the analyst device, an indication of approval for the first substitute item identifier; and
in response to receiving the indication of approval, updating the order to include the first substitute item identifier and exclude the first item identifier.

8. The method of claim 7, further comprising:
prior to updating the order, generating and transmitting an out of stock notification to a user device associated with the order;
updating the order to exclude the first item identifier in response to receiving a reject indication from the user device; and
updating the order to include the first substitute item identifier and exclude the first item identifier in response to receiving an accept indication from the user device.

9. The method of claim 8, further comprising:
updating the similarity between the first item identifier and the first substitute item identifier in the database based on receiving at least one of the accept indication and the reject indication.

10. The method of claim 7, wherein selecting the first substitute item identifier includes selecting the first substitute item identifier according to a weighting of the probability values of the set of substitute item identifiers.

11. The method of claim 7, further comprising:
obtaining a set of in-store item identifiers corresponding to a store associated with the order; and
filtering the set of substitute item identifiers based on the set of in-store item identifiers.

12. The method of claim 7, wherein the first substitute item identifier is selected using a random sampling approach of the corresponding probability values.

13. A non-transitory computer-readable medium having instructions stored thereon, wherein the instructions, when executed by at least one processor, cause a device to perform operations comprising:
receiving, by an item identification module, a notification indicating an order and a first item identifier;
based on the first item identifier, identifying, by an item similarity module, a set of substitute item identifiers, each substitute item identifier of the set of substitute item identifiers including a similarity score determined by an optimization computation including at least a minimax decision algorithm, wherein the similarity score is updated by at least a substitution acceptance rate, and wherein the similarity score and the substitution acceptance rate value are stored in a database;
determining a lower bound for the similarity score of each of the substitute item identifiers in the set of substitute item identifiers by implementing a constrained linear programming based on at least a maximum exploration factor;

determining a probability value for each of the substitute item identifiers of the set of substitute item identifiers based on the lower bound, a value of corresponding items, the similarity score, and the substitution acceptance rate;

based on the probability values and the similarity score corresponding to the set of substitute item identifiers, selecting a first substitute item identifier of the set of substitute item identifiers;

transmitting, to an analyst device, instructions causing generation of a user interface including the first substitute item identifier and the first item identifier;

receiving, from the analyst device, an indication of approval for the first substitute item identifier; and in response to receiving the indication of approval, updating the order to include the first substitute item identifier and exclude the first item identifier.

14. The non-transitory computer-readable medium of claim 13, further comprising:

prior to updating the order, generating and transmitting an out of stock notification to a user device associated with the order;

updating the order to exclude the first item identifier in response to receiving a reject indication from the user device; and updating the order to include the first substitute item identifier and exclude the first item identifier in response to receiving an accept indication from the user device.

15. The non-transitory computer-readable medium of claim 14, further comprising:

updating the similarity between the first item identifier and the first substitute item identifier in the database based on receiving at least one of the accept indication and the reject indication.

16. The non-transitory computer-readable medium of claim 13, wherein selecting the first substitute item identifier includes selecting the first substitute item identifier according to a weighting of the probability values of the set of substitute item identifiers.

17. The non-transitory computer-readable medium of claim 13, further comprising:

obtaining a set of in-store item identifiers corresponding to a store associated with the order; and filtering the set of substitute item identifiers based on the set of in-store item identifiers.

* * * * *